(12) United States Patent  (10) Patent No.: US 7,898,619 B2
Katoh et al.  (45) Date of Patent: Mar. 1, 2011

(54) LIQUID CRYSTAL DISPLAY

(75) Inventors: Hiromi Katoh, Nara (JP); Yoshihiro Izumi, Nara (JP); Kazuhiro Maeda, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 410 days.

(21) Appl. No.: 11/912,331

(22) PCT Filed: Mar. 31, 2006

(86) PCT No.: PCT/JP2006/306827
§ 371 (c)(1),
(2), (4) Date: Oct. 23, 2007

(87) PCT Pub. No.: WO2006/117956
PCT Pub. Date: Nov. 9, 2006

(65) Prior Publication Data
US 2009/0066897 A1 Mar. 12, 2009

(30) Foreign Application Priority Data
Apr. 28, 2005 (JP) .................................. 2005-132938

(51) Int. Cl.
*G02F 1/133* (2006.01)
(52) U.S. Cl. ........................................................ 349/116
(58) Field of Classification Search ............... 349/116
See application file for complete search history.

(56) References Cited

U.S. PATENT DOCUMENTS

| 4,760,389 | A | 7/1988 | Aoki et al. |
| 6,545,815 | B2 | 4/2003 | Kroupenkine et al. |
| 6,577,433 | B1 | 6/2003 | Lin et al. |
| 6,700,556 | B2 | 3/2004 | Richley et al. |
| 6,767,594 | B1 | 7/2004 | Miroshin et al. |
| 7,189,014 | B2 | 3/2007 | Katsuragi et al. |
| 7,438,832 | B2 | 10/2008 | Majumdar et al. |
| 2002/0011978 | A1 | 1/2002 | Yamazaki et al. |
| 2003/0001800 | A1 | 1/2003 | Nakajima et al. |
| 2004/0057143 | A1 | 3/2004 | Steinfield et al. |
| 2005/0030610 | A1 | 2/2005 | Soyama et al. |
| 2005/0231840 | A1 | 10/2005 | Steinfield et al. |
| 2005/0275616 | A1 | 12/2005 | Park et al. |

(Continued)

FOREIGN PATENT DOCUMENTS

AT 85438 2/1993

(Continued)

OTHER PUBLICATIONS

International Search Report mailed Jun. 13, 2006.

(Continued)

*Primary Examiner* — W. Patty Chen
(74) *Attorney, Agent, or Firm* — Nixon & Vanderhye P.C.

(57) ABSTRACT

In a liquid crystal display including a liquid crystal display panel formed by sandwiching a liquid crystal layer between an active matrix substrate and an opposed substrate, and a backlight that illuminates the liquid crystal display panel from a side of the active matrix substrate, a first optical sensor and a second optical sensor are disposed in a peripheral region on a glass substrate of the active matrix substrate. The first optical sensor is formed so that light external to the liquid crystal display and light propagating inside the active matrix substrate enter the first optical sensor. The second optical sensor is formed so that only light propagating inside the active matrix substrate enters the second optical sensor. Also, the second optical sensor is shielded from the external light. For example, a light-shielding film is formed on an upper surface of the second optical sensor.

6 Claims, 4 Drawing Sheets

U.S. PATENT DOCUMENTS

2006/0152474 A1    7/2006    Saito et al.

FOREIGN PATENT DOCUMENTS

| | | |
|---|---|---|
| DE | 36 87 701 | 7/1993 |
| EP | 0 224 869 | 6/1987 |
| JP | 62-125329 | 6/1987 |
| JP | 03-249622 | 11/1991 |
| JP | 4-174819 | 6/1992 |
| JP | 5-241512 | 9/1993 |
| JP | 2000-112382 | 4/2000 |
| JP | 2002-62856 | 2/2002 |
| JP | 2002-175026 | 6/2002 |
| JP | 2004-271717 | 9/2004 |

OTHER PUBLICATIONS

U.S. Appl. No. 11/912,189 filed Oct. 22, 2007; Niwano et al.
International Search Report for PCT/JP2006/311238 mailed Aug. 8, 2006.

LIQUID CRYSTAL DISPLAY

This application is the U.S. national phase of International Application No. PCT/R2006/306827 filed 31 Mar. 2006, which designated the U.S. and claims priority to JP 2005-132938 filed 28 Apr. 2005, the entire contents of each of which are hereby incorporated by reference.

TECHNICAL FIELD

The present invention relates to a liquid crystal display provided with an optical sensor.

BACKGROUND ART

In recent years, liquid crystal displays provided with a so-called environmental sensor (in the following, referred to as an "ambient sensor") for detecting the intensity of ambient light (in the following, referred to as "external light") have been known (for example, see Patent documents 1 and 2). In such liquid crystal displays, the intensity of light from backlight is adjusted according to the intensity of the detected external light.

More specifically, in the case of transparent liquid crystal displays, the light intensity of the backlight is raised in a bright environment such as the outdoors and reduced in a relatively dark environment such as the nighttime and indoors. Thus, the liquid crystal displays provided with the ambient sensor achieve improved screen visibility, lower power consumption and longer lifetime. The liquid crystal displays provided with the ambient sensor are useful particularly as a display device of portable terminals (for example, mobile phones, PDAs, hand-held game machine, etc.) that are often taken outdoors for use.

Examples of the ambient sensor include optical sensors such as a photodiode and a phototransistor. The optical sensor can be mounted on the liquid crystal display by placing an optical sensor provided as a discrete component on a display panel (for example, see Patent document 3). Also, in recent years, in order to cut the manufacturing cost and miniaturize the display device by reducing the number of components, an attempt has been made to form an optical sensor monolithically on an active matrix substrate constituting a display panel (for example, see Patent document 4). In this case, the optical sensor is formed by utilizing the process of forming an active element (TFT).

Herein, the configuration of a liquid crystal display on which an optical sensor is mounted will be described with reference to FIG. 5. FIG. 5 shows a schematic configuration of a conventional liquid crystal display on which an optical sensor is mounted. In FIG. 5, the configuration of a liquid crystal display panel constituting the liquid crystal display is illustrated schematically.

As shown in FIG. 5, the liquid crystal display panel is constituted by sandwiching a liquid crystal layer 102 between an active matrix substrate 101 and an opposed substrate 103. A region of the active matrix substrate 101 that is in contact with the liquid crystal layer 102 serves as a display region. In the display region, a plurality of pixels are arranged in matrix. The pixel includes an active element and a pixel electrode. Further, an optical sensor 104 is formed monolithically in a region surrounding the display region (in the following, referred to as a "peripheral region") by utilizing the process of forming the active element.

A backlight is disposed on a back surface side (a side on which the active element is not formed) of the active matrix substrate 101. In the example of FIG. 5, the backlight is of a sidelight type and mainly includes a light guide plate 108 and a light source 105. The light source 105 is constituted by a fluorescent lamp 106 and a lamp reflector 107. Further, a reflective sheet 109 is attached to a lower surface and lateral surfaces (not shown) of the light guide plate 108. Moreover, a diffusing sheet 110 and a prism sheet 111 are attached to an upper surface (an emission surface) of the light guide plate 108 in this order.

Light emitted from the light source 105 is reflected inside the light guide plate 108 and emitted from the upper surface (the emission surface) of the light guide plate 108. The light emitted from the emission surface of the light guide plate 108 first enters the diffusing sheet 110 and is diffused. This reduces brightness unevenness. Further, the light that has passed through the diffusing sheet 110 is refracted by a prism sheet 111 so as to be turned into light that is substantially parallel with the normal to the emission surface, and passes through the active matrix substrate 101, the liquid crystal layer 102 and the opposed substrate 103 in this order.

Also, at this time, a control device of the backlight (not shown in FIG. 5) adjusts the intensity of light emitted from the light source 105 in the backlight according to the intensity of external light detected by the light sensor 104. Accordingly, using the liquid crystal display illustrated in FIG. 5, it is possible to improve the screen visibility and achieve lower power consumption and longer lifetime.

Patent document 1: JP 4 (1992)-174819 A
Patent document 2: JP 5 (1993)-241512 A
Patent document 3: JP 2002-62856 A (FIGS. 12 to 14)
Patent document 4: JP 2002-175026 A (FIG. 12)

DISCLOSURE OF INVENTION

Problem to be Solved by the Invention

However, in the conventional liquid crystal display, light that has been emitted from the emission surface of the light guide plate 108 and passed through the prism sheet 111 is not perfectly parallel. Thus, as shown in FIG. 5, part of the light emitted from the light guide plate 108 does not enter the liquid crystal layer 102 but is repeatedly subjected to interface reflection by both principal surfaces of the active matrix substrate 101, and then becomes stray light 112.

Further, in the case where the optical sensor 104 is formed monolithically on the active matrix substrate, the stray light 112 sometimes enters the optical sensor 104 as in the above-described example of FIG. 5. In that case, the stray light 112 becomes noise to the optical sensor 104, thus lowering the external light detection accuracy of the optical sensor 104. As a result, in the liquid crystal display, it becomes difficult to adjust the screen brightness appropriately.

It is an object of the present invention to solve the problem described above and to provide a liquid crystal display capable of suppressing a decrease in the detection accuracy when detecting external light.

Means for Solving Problem

In order to achieve the above-mentioned object, a liquid crystal display according to the present invention includes a liquid crystal display panel formed by sandwiching a liquid crystal layer between an active matrix substrate and an opposed substrate, and a backlight that illuminates the liquid crystal display panel from a side of the active matrix substrate. The active matrix substrate includes a first optical sensor and a second optical sensor in a region surrounding a display region in a substrate surface on a side of the liquid crystal layer. The first optical sensor is formed so that light external to the liquid crystal display and light propagating inside the active matrix substrate enter the first optical sensor. The second optical sensor is formed so that light propagating inside the active matrix substrate enters the second optical sensor, and the second optical sensor is shielded from the external light.

Effects of the Invention

With the above-described configuration, in the liquid crystal display according to the present invention, both of external light and stray light enter the first optical sensor, whereas only stray light enters the second optical sensor, so that the second optical sensor outputs only a signal based on the stray light. Thus, with the liquid crystal display according to the present invention, a signal that determines only the intensity of external light excluding a noise component can be taken out easily, thereby making it possible to suppress a decrease in the detection accuracy when detecting external light.

DESCRIPTION OF THE INVENTION

A liquid crystal display according to the present invention includes a liquid crystal display panel formed by sandwiching a liquid crystal layer between an active matrix substrate and an opposed substrate, and a backlight that illuminates the liquid crystal display panel from a side of the active matrix substrate. The active matrix substrate includes a first optical sensor and a second optical sensor in a region surrounding a display region in a substrate surface on a side of the liquid crystal layer. The first optical sensor is formed so that light external to the liquid crystal display and light propagating inside the active matrix substrate enter the first optical sensor. The second optical sensor is formed so that light propagating inside the active matrix substrate enters the second optical sensor, and the second optical sensor is shielded from the external light.

In the above-described liquid crystal display according to the present invention, it is preferable that the first optical sensor and the second optical sensor are disposed in the region surrounding the display region so as to be equidistant from an outer edge of the display region of the active matrix substrate. In this case, the external light detection accuracy of the first optical sensor can be improved. Also, in this case, if the display region is rectangular, it is preferable that the first optical sensor and the second optical sensor are aligned along one of four sides that form the outer edge of the display region, in terms of further improvement of the detection accuracy.

Also, in the above-described liquid crystal display according to the present invention, a plurality of active elements may be formed on the active matrix substrate, and at least part of constituent members of the first optical sensor and the second optical sensor may be formed on the active matrix substrate by a same process as constituent members of the active elements.

The above-described liquid crystal display according to the present invention can further include a first detector circuit, a second detector circuit, and a comparator circuit. The first detector circuit may detect a signal outputted from the first optical sensor and output a first voltage signal according to an intensity of light entering the first optical sensor. The second detector circuit may detect a signal outputted from the second optical sensor and output a second voltage signal according to an intensity of light entering the second optical sensor. The comparator circuit may output a signal in order for the liquid crystal display to determine an intensity of the external light based on a difference value between the first voltage signal and the second voltage signal. This makes it possible to adjust the brightness with high accuracy.

Embodiment

Figure 1:
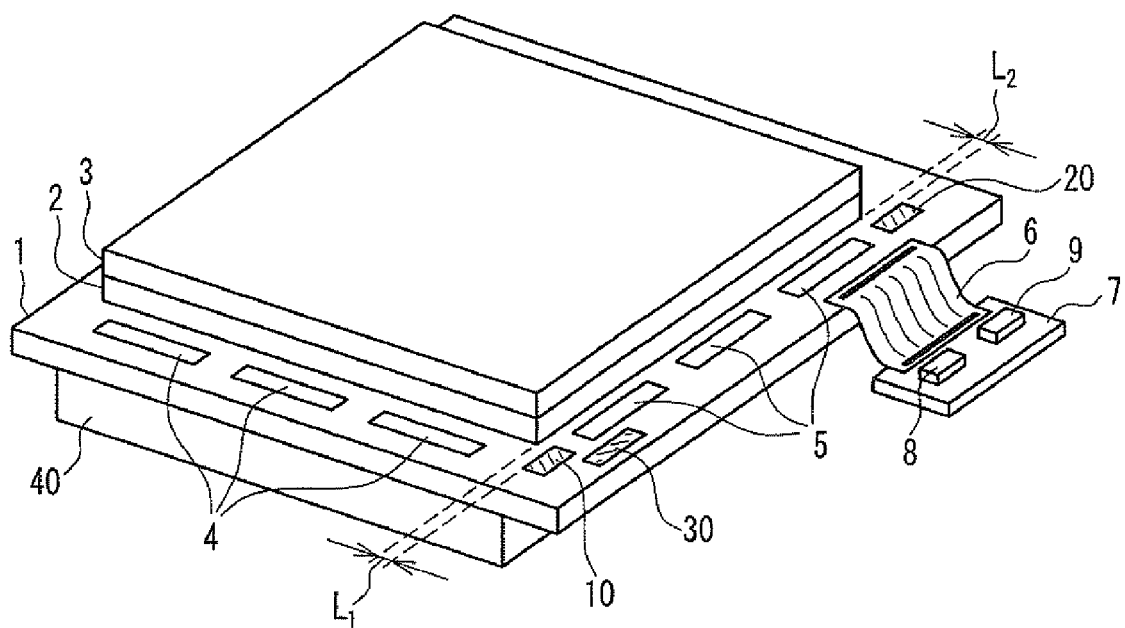
FIG. 1 is a perspective view showing an overall configuration of a liquid crystal display in an embodiment of the present invention.

In the following, a liquid crystal display according to an embodiment of the present invention will be described with reference to FIGS. 1 to 4. First, referring to FIGS. 1 and 2, the configuration of the liquid crystal display in the present embodiment will be described. FIG. 1 is a perspective view showing an overall configuration of the liquid crystal display according to an embodiment of the present invention.

As shown in FIG. 1, the liquid crystal display in the present embodiment includes a liquid crystal display panel formed by sandwiching a liquid crystal layer 2 between an active matrix substrate 1 and an opposed substrate 3, and a backlight 40. A region in the active matrix substrate 1 that is in contact with the liquid crystal layer 2 serves as a display region. Although not shown in the figure, a plurality of pixels including an active element and a pixel electrode are formed in matrix in the display region. Further, the display region is rectangular.

In a region surrounding the display region (in the following, referred to as a "peripheral region") in a substrate surface of the active matrix substrate 1 on a side of the liquid crystal layer 2, horizontal driving circuits (source drivers) 4 and vertical driving circuits (gate drivers) 5 are mounted. TFTs constituting the horizontal driving circuits 4 and the vertical driving circuits 5 are formed monolithically on a base substrate (a glass substrate) of the active matrix substrate 1 using a process of forming the active element (see FIG. 2). Incidentally, the "formed monolithically on a glass substrate" means that elements are formed directly on the glass substrate by a physical process and/or a chemical process and excludes the case in which a semiconductor circuit is placed on the glass substrate.

Furthermore, an external substrate 7 is connected to the active matrix substrate 1 via an FPC 6. On the external substrate 7, an IC chip 8 and an IC chip 9 are placed. The IC chip 9 includes a reference supply circuit for generating a power supply voltage to be used in the display device. The IC chip 8 includes a control circuit for controlling the horizontal driving circuits 4 and the vertical driving circuits 5. In the present embodiment 1, IC chips other than the IC chips 8 and 9 may also be placed on the external substrate 7.

Figure 5:
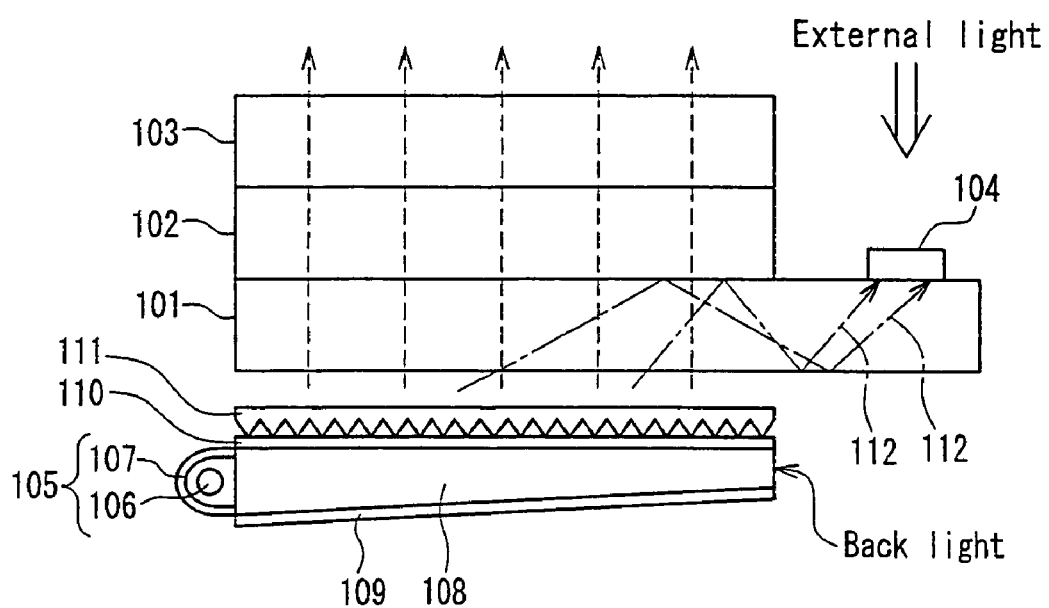
FIG. 5 shows a schematic configuration of a conventional liquid crystal display on which an optical sensor is mounted.

The backlight 40 includes a light guide plate and a light source similarly to the backlight illustrated in FIG. 5 in the background art section. The backlight 40 illuminates the liquid crystal display panel from the side of the active matrix substrate 1. In the present embodiment, the backlight 40 may be a backlight of either a direct type or a sidelight type. Also, the light source of the backlight 40 is not particularly limited but can be, for example, a fluorescent lamp or a light-emitting diode.

Figure 3:
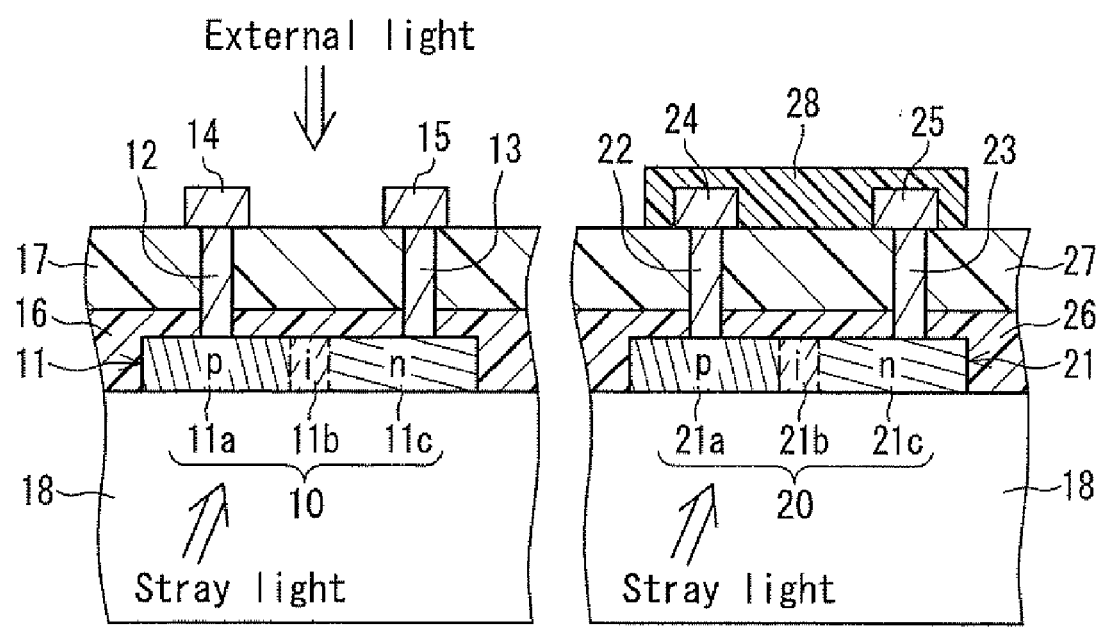
FIG. 3 is a sectional view showing a specific configuration of a first optical sensor and a second optical sensor shown in FIG. 1.

Further, in order to detect the intensity of external light, the active matrix substrate 1 includes a first optical sensor 10, a second optical sensor 20 and a detecting device 30 in the peripheral region in the substrate surface on the side of the liquid crystal layer 2. In the present embodiment, the first optical sensor 10 and the second optical sensor 20 are formed monolithically on the base substrate (the glass substrate) of the active matrix substrate 1 using the process of forming the active element as shown in FIG. 3, which will be described later.

Figure 2:
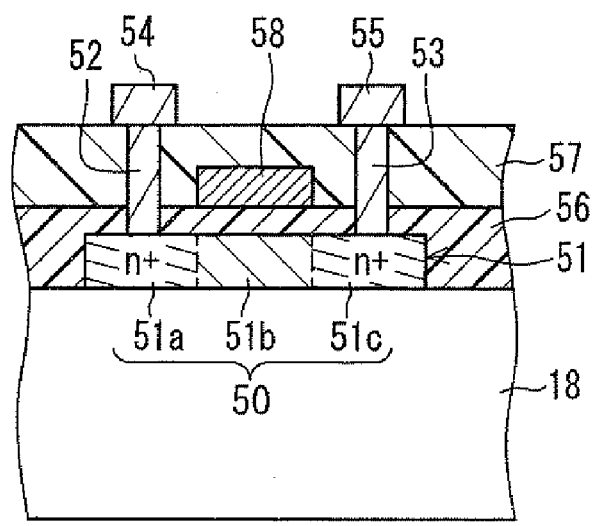
FIG. 2 is a sectional view showing a configuration of an active element formed in an active matrix substrate shown in FIG. 1.

FIG. 2 is a sectional view showing the configuration of an active element formed in the active matrix substrate shown in FIG. 1. As shown in FIG. 2, in the present embodiment, an active element 50 includes a silicon film 51 formed on a glass substrate 18 and a gate electrode 58 disposed in an upper layer thereof. The glass substrate 18 is a base substrate of the active matrix substrate 1. In FIG. 2, hatching is omitted for the glass substrate 18.

In the example of FIG. 2, the silicon film 51 is formed by forming a silicon film on the glass substrate 18 and then forming a resist pattern by a photolithography method, followed by etching using the resist pattern as a mask. It is preferable that the silicon film to be formed at this time is a silicon film whose charge transfer rate is greater than an amorphous silicon film, for example, a polysilicon film, a low-temperature polysilicon film, a CG (continuous-grain) silicon film or the like. In the present embodiment, this is to form the horizontal driving circuits 4 and the vertical driving circuits 5 monolithically on the glass substrate 18.

Also, in the example of FIG. 2, the active element 50 is an n-type TFT. N-type semiconductor regions 51a and 51c serving as a source and a drain of the TFT are formed in the silicon film 51. The n-type semiconductor regions 51a and 51c are formed by ion implantation of n-type impurities such as arsenic. Numeral 51b denotes a channel region serving as a channel of the TFT.

A first interlayer insulating film 56 is interposed between the gate electrode 58 and the silicon film 51. A portion of the first interlayer insulating film 56 located immediately below the gate electrode 58 functions as a gate insulating film. In the example of FIG. 2, the first interlayer insulating film 56 is formed by forming a silicon nitride film or a silicon oxide film by a CVD method after forming the silicon film 51. Also, the gate electrode 58 is formed by forming an electrically-conductive film such as a silicon film on the first interlayer insulating film 56 by a CVD method or the like and then forming a resist pattern by a photolithography method, followed by etching using the resist pattern as a mask.

On the first interlayer insulating film 56, a second interlayer insulating film 57 is formed so as to cover the gate electrode 58. The second interlayer insulating film 57 is formed by forming a silicon nitride film or a silicon oxide film by a CVD method similarly to the first interlayer insulating film 56, after forming the gate electrode 58.

Moreover, contact plugs 52 and 53 are formed so as to penetrate through the first interlayer insulating film 56 and the second interlayer insulating film 57. The contact plugs 52 and 53 are formed by forming contact holes penetrating through the first interlayer insulating film 56 and the second interlayer insulating film 57 and then filling the contact holes with an electrically conductive material such as tungsten. On the second interlayer insulating film 57, electrode patterns 54 and 55 to be connected to the contact plugs 52 and 53 are also formed. The electrode patterns 54 and 55 are formed by forming an electrically-conductive film on the second interlayer insulating film 57 and patterning it by photolithography and etching.

As mentioned earlier, in the present embodiment, the first optical sensor 10 and the second optical sensor 20 are formed monolithically in the active matrix substrate 1. Therefore, when stray light (see FIG. 5) is generated, it may enter the first optical sensor 10 and the second optical sensor 20. Accordingly, in the present embodiment, the intensity of the stray light is determined by shielding the second optical sensor 20 from external light. Also, an output signal of the first optical sensor 10 and that of the second optical sensor 20 are compared using the detecting device 30, thereby removing a noise component caused by the stray light from the output signal of the first optical sensor 10.

Herein, referring to FIGS. 3 and 4, the specific configuration of the first optical sensor 10 and the second optical sensor 20 and the circuit configuration and function of the detecting device 30 will be described. FIG. 3 is a sectional view showing the specific configuration of the first optical sensor and the second optical sensor shown in FIG. 1. In FIG. 3, the left half shows the first optical sensor 10, and the right half shows the second optical sensor 20.

As shown in FIG. 3, in the present embodiment, the first optical sensor 10 and the second optical sensor 20 are both PIN-type photodiodes. The first optical sensor 10 includes a silicon film 11 formed on the glass substrate 18. The silicon film 11 is provided with a p-type semiconductor region (a p layer) 11a, an intrinsic semiconductor region (an i layer) 11b and an n-type semiconductor region (an n layer) 11c. Similarly, the second optical sensor 20 includes a silicon film 21 formed on the glass substrate 18. The silicon film 21 is also provided with a p layer 21a, an i layer 21b and an n layer 21c.

Further, a first interlayer insulating film 16 and a second interlayer insulating film 17 are layered in this order on an upper surface of the first optical sensor 10. Similarly, a first interlayer insulating film 26 and a second interlayer insulating film 27 are also layered in this order on an upper surface of the second optical sensor. Moreover, the p layer 11a of the optical sensor 10 is connected to an electrode pattern 14 via a contact plug 12, and an n layer 11c of the optical sensor 10 is connected to an electrode pattern 15 via a contact plug 13. Similarly, the p layer 21a of the optical sensor 20 is connected to an electrode pattern 24 via a contact plug 22, and an n layer 21c of the optical sensor 20 is connected to an electrode pattern 25 via a contact plug 23.

Furthermore, constituent members of the first optical sensor 10 and the second optical sensor 20 are formed by the same process as those of the active element 50 shown in FIG. 2. Now, this will be described more specifically. The silicon film 11 in the first optical sensor 10 and the silicon film 21 in the second optical sensor 20 are the same as the silicon film 51 in the active element 50 shown in FIG. 2. The silicon film 11 in the first optical sensor 10 and the silicon film 21 in the second optical sensor 20 are formed at the same time with the silicon film 51 by the process of forming the silicon film 51 in the active element 50.

Also, the n layer 11c and the p layer 11a in the silicon film 11 and the n layer 21c and the p layer 21a in the silicon film 21 are formed by the process of forming the p-type or n-type semiconductor region of the active element 50 (see FIG. 2), the horizontal driving circuits 4 and the vertical driving circuits 5 (see FIG. 1) (the ion implantation process). For example, the n layer 11c in the silicon film 11 and the n layer 21c in the silicon film 21 can be formed by the process of forming the semiconductor regions 51a and 51c in the active element 50 illustrated in FIG. 2 (the ion implantation process). In the case where the semiconductor regions 51a and 51c in the active element 50 are formed by plural times of ion implantation with different implantation conditions, an ion implantation that is most suitable for forming the n layer 11c and the n layer 21c is selected among them.

Incidentally, it is appropriate that the i layer 11b in the silicon film 11 and the i layer 21b in the silicon film 21 are more nearly electrically-neutral than the n layers 11c and 21c and the p layers 11a and 21a. More specifically, the i layer 11b and the i layer 21b are formed so that their impurity concentrations are smaller than the impurity concentrations of the n layers 11c and 21c and the p layers 11a and 21a. For example, the i layer 11b and the i layer 21b can be formed by providing a mask in regions where the i layer 11b and the i layer 21b are to be formed at the time of ion implantation or, if the formed silicon film is not electrically neutral, by performing ion implantation in the regions where the i layer 11b and the i layer 21b are to be formed. When the ion implantation is performed, among the ion implantation processes performed for forming the active element 50, the horizontal driving circuits 4 and the vertical driving circuits 5, an ion implantation whose condition is most suitable can be selected and utilized.

Furthermore, both of the first interlayer insulating film 16 covering the first optical sensor 10 and the first interlayer insulating film 26 covering the second optical sensor 20 are the same insulating films as the first interlayer insulating film 56 in the active element 50 shown in FIG. 2. They are formed using the process of forming the first interlayer insulating film 56 in the active element 50. Similarly, the second interlayer insulating film 17 and the second interlayer insulating film 27 are also the same insulating films as the second interlayer insulating film 57 in the active element 50 shown in FIG. 2. They are also formed using the process of forming the second interlayer insulating film 57 in the active element 50 shown in FIG. 2.

As described above, in the present embodiment, the first optical sensor 10 and the second optical sensor 20 have a common configuration formed by the same forming process. However, in the second optical sensor 20, a light-shielding film 28 is formed on the second interlayer insulating film 27 unlike the first optical sensor 10. Accordingly, external light does not enter the i layer 21b in the second optical sensor 20. Thus, the first optical sensor 10 outputs a signal (an electromotive current) in response to both of the external light and the stray light, whereas the second optical sensor 20 outputs a signal (an electromotive current) in response to only the stray light. The output signal of the first optical sensor 10 and the output signal of the second optical sensor 20 are both inputted to the detecting device 30 shown in FIG. 4.

In the present embodiment, the light-shielding film 28 is appropriate as long as it prevents the external light from entering the i layer 21b, and the shape and material thereof are not particularly limited. The light-shielding film 28 can be, for example, a nontransparent tape, a nontransparent resin, a nontransparent ink or the like. Also, in the present invention, members other than the light-shielding film 28 may serve to prevent the external light from entering the i layer 21b. For example, a frame, a cover or the like of the liquid crystal display panel may prevent the external light from entering the i layer 21b.

Figure 4:
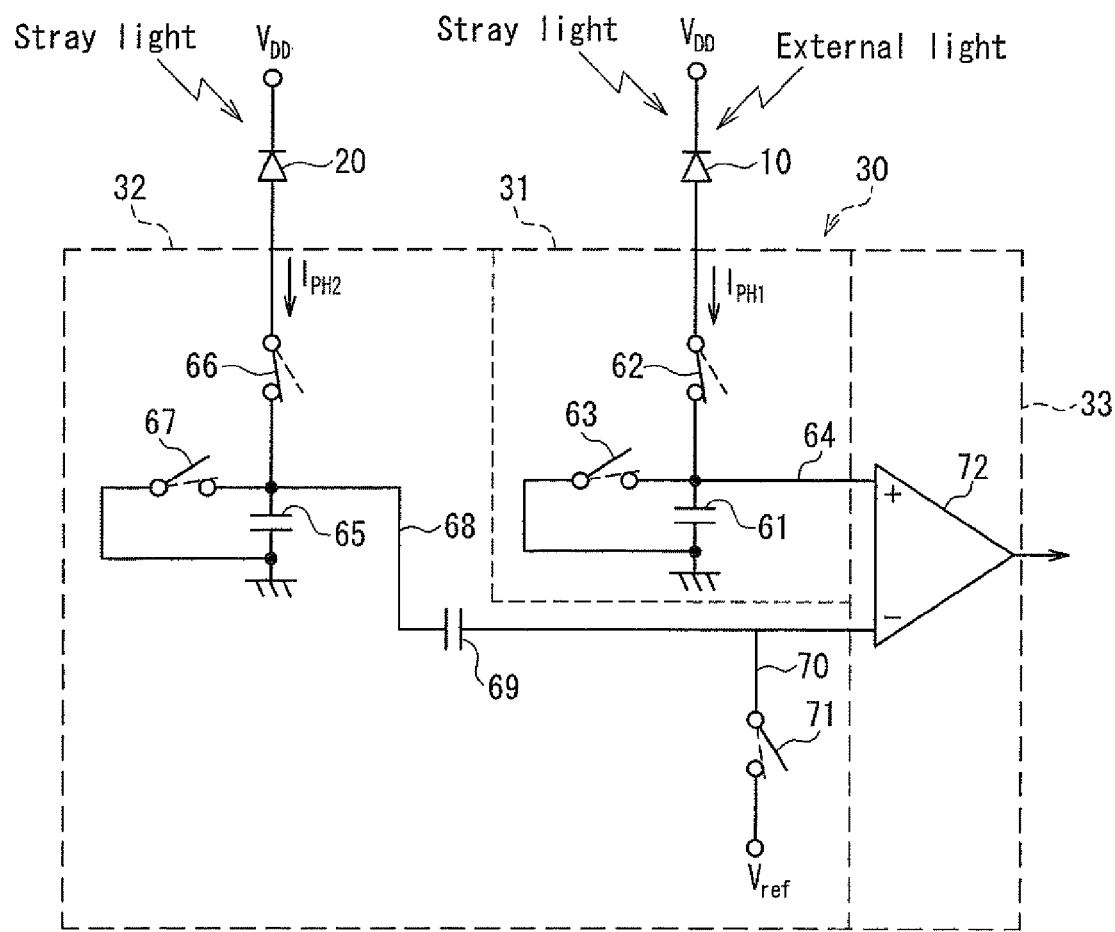
FIG. 4 is a circuit diagram showing a circuit configuration of a detecting device shown in FIG. 1.

FIG. 4 is a circuit diagram showing a circuit configuration of the detecting device shown in FIG. 1. As shown in FIG. 4, the detecting device 30 includes a first detector circuit 31, a second detector circuit 32 and a comparator circuit 33. The first detector circuit 31 is connected to a cathode of the first optical sensor 10, and the second detector circuit 32 is connected to a cathode of the second optical sensor 20. The comparator circuit 33 includes a comparator 72. Further, the first detector circuit 31 and the second detector circuit 32 are respectively connected to input terminals of the comparator 72.

An anode of the first optical sensor 10 and an anode of the second optical sensor 20 are connected to a power supply potential $V_{DD}$ and supplied with a bias voltage. Thus, when at least one of the external light and the stray light enters the first optical sensor 10, the first optical sensor 10 outputs an electromotive current $I_{PH1}$ (an output signal) to the first detector circuit 31. On the other hand, only when the stray light enters the second optical sensor 20, the second optical sensor 20 outputs an electromotive current $I_{PH2}$ (an output signal) to the second detector circuit 32.

The first detector circuit 31 includes a capacitor 61, a sensing switch 62 and a refreshing switch 63. The capacitor 61 is connected to the first optical sensor 10 in series and accumulates electric charges when the first optical sensor outputs the electromotive current $I_{PH1}$. Accordingly, a voltage according to the amount of the accumulated electric charges is generated between both poles of the capacitor 61. As a result, a voltage signal according to the magnitude of electromotive current $I_{PH1}$, namely, according to the intensity of light entering the first optical sensor 10 is outputted via an output wiring 64 that branches off from a wiring connecting the first optical sensor 10 and the capacitor 61. The voltage signal is inputted to the comparator 72.

The sensing switch 62 is connected between the first optical sensor 10 and the capacitor 61 in series. The refreshing switch 63 is connected to the capacitor 61 in parallel. In the first detector circuit 31, the refreshing switch 63 is turned on and the sensing switch 62 is turned off (as in the state indicated by broken lines in FIG. 4) so as to reset the capacitor 61. The refreshing switch 63 is turned off and the sensing switch 62 is turned on so as to carry out detection.

The second detector circuit 32 includes a first capacitor 65, a second capacitor 69, a sensing switch 66, a first refreshing switch 67 and a second refreshing switch 71. Among the above, the first capacitor 65, the sensing switch 66 and the first refreshing switch 67 constitute a circuit similar to the first detector circuit 31. Therefore, when the second optical sensor 20 outputs the electromotive current $I_{PH2}$, a voltage signal according to the intensity of light inputted to the second optical sensor 20 is outputted via an output wiring 68 that branches off from a wiring connecting the second optical sensor 20 and the first capacitor 65. The output wiring 68 is connected to the input terminal of the comparator 72.

Also, in the second detector circuit 32, the second capacitor 69 is provided in the output wiring 68 in series. Further, a branching wiring 70 that branches off from the output wiring 68 at a position between the second capacitor 69 and the input terminal of the comparator 72 is connected to a reference potential $V_{ref}$ via the second refreshing switch 71. When the second refreshing switch 71 is turned on, electric charges are accumulated in the second capacitor 69, and a voltage between both poles of the capacitor 69 becomes $V_{ref}$.

Thus, when the sensing switch 66 is turned on and the first refreshing switch 67 and the second refreshing switch 71 are turned off so as to carry out detection, a voltage signal at a voltage level of "voltage by the electromotive current $I_{PH2}$+ $V_{ref}$" is outputted from the second detector circuit 32. In other words, the second detector circuit 32 outputs to the comparator 72 a voltage obtained by superimposing the voltage according to the intensity of light entering the second optical sensor 20 on the reference voltage $V_{ref}$.

Also, the comparator 72 compares the voltage signal inputted from the first detector circuit 31 and the voltage signal inputted from the second detector circuit 32 and outputs a signal at logic high or logic low according to the result of the comparison. In other words, the comparator 72 determines whether a difference value between the voltage signal according to the intensity of light entering the first optical sensor 10 and the voltage signal according to the intensity of light entering the second optical sensor 20 is greater than a preset reference value (reference voltage $V_{ref}$). This difference value corresponds to a voltage signal based on only the intensity of external light from which a noise due to stray light has been removed. Also, the comparator 72 switches the logic level of a logic signal when the difference value exceeds the reference value.

Moreover, the signal outputted from the comparator 72 is inputted to a digital signal generating circuit, for example. The digital signal generating circuit counts the time since the first detector circuit 31 outputs the voltage signal until the comparator 72 switches the logic signal, and converts the counted value into a digital signal. At this time, the counted value decreases with an increase in the intensity of light entering the optical sensor. A control device (not shown) of the backlight 40 adjusts the brightness of the backlight based on this digital signal.

As described above, the liquid crystal display in the present embodiment uses the second optical sensor 20, thereby removing a noise component due to stray light from the signal outputted from the first optical sensor 10 for detecting external light. Thus, the liquid crystal display in the present embodiment makes it possible to suppress a decrease in external light detection accuracy caused by stray light.

Further, the optical sensor generally outputs a photocurrent generated by photoexcitation and a dark current independent of a light incident amount as the electromotive current. Moreover, the optical sensor has a temperature dependence in which current values of the photocurrent and the dark current both vary according to an ambient temperature. Also, in terms of the detection accuracy of the optical sensor, the temperature dependence of the dark current is dominant over the temperature dependence of the photocurrent, so that it is important to make temperature compensation for the dark current.

Now, in the present embodiment, the temperature variation of the electromotive current (the photocurrent) generated by the stray light in the first optical sensor 10 is substantially the same as that in the second optical sensor 20. Also, since the first optical sensor 10 and the second optical sensor 20 have the same configuration as illustrated in FIG. 3, the dark currents outputted from them have substantially the same current value. Furthermore, the temperature variations of the dark currents outputted from them are substantially the same. Therefore, the liquid crystal display according to the present embodiment makes it possible to not only compensate for an error caused by the stray light but also compensate for an error caused by the dark current and compensate for the temperature dependence.

Moreover, in the present embodiment, in terms of an improvement of external light detection accuracy, it is preferable that the intensity of stray light entering the first optical sensor 10 and that entering the second optical sensor 20 are the same. More specifically, it is preferable that the first optical sensor 10 and the second optical sensor 20 are disposed in the peripheral region so as to be equidistant from an outer edge of the display region of the active matrix substrate 1. Further, the directivity of the light emitted from the backlight 40 is sometimes different between vertical and horizontal directions of the screen. Therefore, it is preferable that the first optical sensor 10 and the second optical sensor 20 are aligned along one of four sides that form the outer edge of the display region.

Accordingly, in the present embodiment, the distance $L_1$ between the first optical sensor 10 and the outer edge of the display region and the distance $L_2$ between the second optical sensor 20 and the outer edge of the display region are set to be equal as shown in FIG. 1. Also, the first optical sensor 10 and the second optical sensor 20 are disposed to face the same side.

The first optical sensor 10 and the second optical sensor 20 are disposed at both ends of one side of the display region, and the vertical driving circuits 5 are disposed therebetween in the example illustrated by FIG. 1. However, the present invention is not limited to this example. In the present invention, the first optical sensor 10 and the second optical sensor 20 may be adjacent to each other, with no other circuit or chip being disposed therebetween.

Although the present embodiment illustrates photodiodes as the first optical sensor 10 and the second optical sensor 20, the first optical sensor and the second optical sensor in the present invention are not limited to photodiodes. In the present invention, an optical sensor other than the photodiode, for example, a phototransistor or the like may also be used. Further, in the present invention, the first optical sensor and the second optical sensor do not have to be formed monolithically in the active matrix substrate. The present invention can be applied without causing any problems as long as it is a liquid crystal display provided with an optical sensor that light propagating inside the active matrix substrate enters.

INDUSTRIAL APPLICABILITY

The liquid crystal display according to the present invention is useful as a liquid crystal display that is provided with an optical sensor and adjusts screen brightness according to the intensity of external light, and thus has an industrial applicability.

The invention claimed is:

1. A liquid crystal display comprising:
   a liquid crystal display panel formed by sandwiching a liquid crystal layer between an active matrix substrate and an opposed substrate; and
   a backlight that illuminates the liquid crystal display panel from a side of the active matrix substrate;
   wherein the active matrix substrate comprises a first optical sensor and a second optical sensor in a region surrounding a display region in a substrate surface on a side of the liquid crystal layer,
   the first optical sensor is formed so that light external to the liquid crystal display and light propagating inside the active matrix substrate enter the first optical sensor,
   the second optical sensor is formed so that light propagating inside the active matrix substrate enters the second optical sensor, and the second optical sensor is shielded from the external light; and
   wherein the first optical sensor is positioned for receiving both light from external the display and also light from the backlight.

2. The liquid crystal display according to claim 1, wherein the first optical sensor and the second optical sensor are disposed in the region surrounding the display region so as to be equidistant from an outer edge of the display region of the active matrix substrate.

3. The liquid crystal display according to claim 2, wherein the display region is rectangular, and
the first optical sensor and the second optical sensor are aligned along one of four sides that form the outer edge of the display region.

4. The liquid crystal display according to claim 1, wherein a plurality of active elements are formed on the active matrix substrate, and
at least part of constituent members of the first optical sensor and the second optical sensor is formed on the active matrix substrate by a same process as constituent members of the active elements.

5. The liquid crystal display according to claim 1, wherein a light-shielding film is formed in the second optical sensor on a side opposite to the active matrix substrate.

6. The liquid crystal display according to claim 1, further comprising
a first detector circuit,
a second detector circuit, and
a comparator circuit,
wherein the first detector circuit detects a signal outputted from the first optical sensor and outputs a first voltage signal according to an intensity of light entering the first optical sensor,
the second detector circuit detects a signal outputted from the second optical sensor and outputs a second voltage signal according to an intensity of light entering the second optical sensor, and
the comparator circuit outputs a signal in order for the liquid crystal display to determine an intensity of the external light based on a difference value between the first voltage signal and the second voltage signal.

* * * * *